United States Patent
Tang et al.

(10) Patent No.: US 10,451,805 B2
(45) Date of Patent: Oct. 22, 2019

(54) WAVELENGTH DIVISION MULTIPLEXING/DEMULTIPLEXING OPTICAL TRANSCEIVING ASSEMBLY BASED ON DIFFRACTION GRATING

(71) Applicant: WUHAN TELECOMMUNICATION DEVICES CO.,LTD., Wuhan, Hubei (CN)

(72) Inventors: Xuesheng Tang, Wuhan (CN); Di Zhang, Wuhan (CN); Shenglei Hu, Wuhan (CN); Yongan Fu, Wuhan (CN); Yanfeng Fu, Wuhan (CN); Chenggang Liu, Wuhan (CN); Shiyu Li, Wuhan (CN); Liping Sun, Wuhan (CN); Weidong Ma, Wuhan (CN)

(73) Assignee: WUHAN TELECOMMUNICATION DEVICES CO., LTD, Wuhan, Hubei Province (CN)

( * ) Notice: Subject to any disclaimer, the term of this patent is extended or adjusted under 35 U.S.C. 154(b) by 0 days.

(21) Appl. No.: 15/770,371

(22) PCT Filed: Dec. 28, 2015

(86) PCT No.: PCT/CN2015/099206
§ 371 (c)(1),
(2) Date: Apr. 23, 2018

(87) PCT Pub. No.: WO2017/067068
PCT Pub. Date: Apr. 27, 2017

(65) Prior Publication Data
US 2018/0314006 A1    Nov. 1, 2018

(30) Foreign Application Priority Data
Oct. 23, 2015    (CN) .......................... 2015 1 0698720

(51) Int. Cl.
*G02B 6/293*    (2006.01)
*H04J 14/02*    (2006.01)
(Continued)

(52) U.S. Cl.
CPC ........ *G02B 6/2931* (2013.01); *G02B 6/29311* (2013.01); *G02B 6/29313* (2013.01);
(Continued)

(58) Field of Classification Search
CPC .............. G02B 6/2931; G02B 6/29311; G02B 6/4215; G02B 6/29313; G02B 6/2938; H04B 10/40; H04J 14/0256; H04J 14/02
(Continued)

(56) References Cited

FOREIGN PATENT DOCUMENTS

| CN | 1523388 A | 8/2004 |
|---|---|---|
| CN | 101170242 A | 4/2008 |

(Continued)

*Primary Examiner* — Leslie C Pascal
(74) *Attorney, Agent, or Firm* — Muncy, Geissler, Olds & Lowe, P.C.

(57) ABSTRACT

The present invention provides a wavelength division multiplexing/demultiplexing optical transceiving assembly based on a diffraction grating, which is an uplink optical emitting unit and a downlink optical receiving unit that comprise a laser chip array, a light receiving detector array, a first fast axis collimating lens, a second fast axis collimating lens, a first slow axis collimating lens, a diffraction grating, a slow axis focusing lens, a second slow axis collimating lens, an optical isolator, a coupling output lens, a coupling input lens, a coupling outputting optical fiber and a coupling inputting optical fiber. The wavelength division multiplexing/demultiplexing optical transceiving assembly solves the technical problem of sharing a diffraction grating to realize a wavelength division multiplexing/demultiplexing function, achieves the beneficial effects of better diffraction grating filtering property, smaller light path coupling (Continued)

loss and insertion loss correlative with wavelength, larger independent optical element sizes, and simpler assembly process, and is more suitable for manufacturing a multi-channel wavelength division multiplexing/demultiplexing optical transceiving assembly.

10 Claims, 2 Drawing Sheets

(51) Int. Cl.
      *H04B 10/40*       (2013.01)
      *G02B 6/42*       (2006.01)

(52) U.S. Cl.
      CPC ........... *G02B 6/4215* (2013.01); *H04B 10/40* (2013.01); *H04J 14/02* (2013.01); *H04J 14/0256* (2013.01); *G02B 6/2938* (2013.01)

(58) Field of Classification Search
      USPC .................................................. 398/135–139
      See application file for complete search history.

(56) References Cited

FOREIGN PATENT DOCUMENTS

| | | |
|---|---|---|
| CN | 103543497 A | 1/2014 |
| CN | 103969748 A | 8/2014 |
| CN | 104076450 A | 10/2014 |
| JP | 2004264446 A | 9/2004 |

WAVELENGTH DIVISION MULTIPLEXING/DEMULTIPLEXING OPTICAL TRANSCEIVING ASSEMBLY BASED ON DIFFRACTION GRATING

TECHNICAL FIELD

The present invention relates to the technical field of optical communication, and particularly, to a wavelength division multiplexing/demultiplexing optical transceiving assembly based on a diffraction grating.

BACKGROUND ART

With the universal popularization of the network information industry and the outcoming explosive growth of global data and the rise of the big data industry, data centers have become a new market opportunity of the optical communication industry, and high bandwidth optical interconnection has gradually replaced electrical interconnection, and will develop towards the trend of high speed and large capacity. Multi-channel optical modules adopt multiplex optical emitting and receiving techniques, and have the characteristics of large communication capacity, low energy consumption and miniaturization, which has been favored by the industry. Their transmission rate and transmission capacity are much more superior than single-channel transceiving modules, and have developed rapidly in the recent years, to be one of the main solutions for the developing.

At present, high-speed multi-channel optical modules package multi-channel semiconductor laser/detector array into input/outputted light components with only one light port by wavelength division multiplexing/demultiplexing (wavelength division multiplexing, WDM) technique, as so to improve the transmission speed of the single-end light port. The common packaging forms include CFP, CFP2, CFP4 and QSFP, etc. For example, 4×25 Gbps single mode optical transceiving modules with the packaging form of the QSFP28 module couple four 25 Gbps laser/detector chips with different CWDM wavelengths to a single optical fiber by coarse wavelength division multiplexing/demultiplexing technique, to achieve that a single optical fiber can transmit 100 Gbps signals.

At present, the solutions often used by the wavelength division multiplexing/demultiplexing technique in the industry include: arrayed waveguide grating (AWG) solution, etching grating solution and dielectric thin film filter solution, and so on. The AWG has the advantages of high integration, can be fabricated on one same substrate with the laser chips and detector chips, and has great advantages for multiplexing and demultiplexing applying in more than 4 channels. However, it has high cost, high difficulty in coupling, and big insertion loss, so it is not conducive to meet the requirements on optical transceiving modules for low power consumption. In addition to the defects of its size being a half smaller than that of the AWG and imperfect filtering characteristics, the other advantages and disadvantages of the etching grating solution are similar to those of the AWG. The dielectric thin film filter solution is currently large-scale commercial plan with the advantages of low cost of material and good filtering performance, and the shortcoming is that it is not suitable for the multiplexing/demultiplexing of more channels (more than four channels): as the increasing of the number of the optical channels for multiplexing/demultiplexing, the kinds and amounts of the filters corresponding to the optical channels will increase, the light paths in the optical assembly will be increasingly longer, the requirements on the processing tolerance and the fitting accuracy of the optical elements on the related plane will gradually improve, the difference of the light paths between the optical channels has significant increased, and the insert loss correlative with wavelength has become a problem that has to be solved. At the same time, with the limit of the above fitting accuracy, in the current commercial main solutions of eight channels and above, the light paths of the transmitting component and the receiving component are generally independent, and the transmitting component and the receiving component respectively use a set of filters, so as to significantly increase the number of the independent elements with small size.

Technical Problem

To solve the above technical problem, the main object of the present invention is to provide a wavelength division multiplexing/demultiplexing optical transceiving assembly based on a diffraction grating.

Technical Solution

In order to achieve the above object, the technical solution of the present invention is that: a wavelength division multiplexing/demultiplexing optical transceiving assembly based on a diffraction grating, which is an uplink optical emitting unit and a downlink optical receiving unit that comprise a laser chip array, a light receiving detector array, a first fast axis collimating lens, a second fast axis collimating lens, a first slow axis collimating lens, a diffraction grating, a slow axis focusing lens, a second slow axis collimating lens, an optical isolator, a coupling output lens, a coupling input lens, a coupling outputting optical fiber and a coupling inputting optical fiber, wherein: the first fast axis collimating lens and the laser chip array are arranged correspondingly to each other, the second fast axis collimating lens and the light receiving detector array are arranged correspondingly to each other, the laser chip array and the light receiving detector array are arranged perpendicularly and staggered vertically, the coupling output lens and the coupling outputting optical fiber constitute an outgoing optical fiber collimator and the coupling input lens and the coupling inputting optical fiber constitute an incoming optical fiber collimator, which respectively output an emitted light signal and receive an incident light signal, and the emitted light and the incident light are distributed in the up and down direction to pass through the first slow axis collimating lens, the diffraction grating, the slow axis focusing lens and the second slow axis collimating lens.

Preferably in the embodiment, the optical emitting unit and the receiving unit share the first slow axis collimating lens, the diffraction grating, the slow axis focusing lens and the second slow axis collimating lens, the first fast axis collimating lens and the second fast axis collimating lens are used for light beam collimation in the meridian plane, the first slow axis collimating lens is used for light beam collimation in the sagittal plane, the diffraction grating light path is used for wavelength division multiplexing/demultiplexing, the slow axis focusing lens and the second slow axis collimating lens constitute a light beam expanding/shrinking system to realize light beam transformation, and the optical isolator is used to realize reverse isolation of the outputted light.

Preferably in the embodiment, the optical emitting unit according to the light path setting comprises the laser chip array, the first fast axis collimating lens, the first slow axis collimating lens, the diffraction grating, the slow axis focusing lens, the second slow axis collimating lens, the optical isolator, the coupling output lens and the coupling outputting optical fiber.

Preferably in the embodiment, the optical receiving unit according to the light path setting comprises the coupling inputting optical fiber, the coupling input lens, the second slow axis collimating lens, the slow axis focusing lens, the diffraction grating, the first slow axis collimating lens, the second fast axis collimating lens, and the light receiving detector array.

Preferably in the embodiment, the laser chip array has a light-emitting unit, wherein, the laser chip array is an array consisting of a plurality of discrete laser chips with different wavelengths, or an array consisting of a single laser chip having a plurality of light-emitting units with different wavelengths.

Preferably in the embodiment, the light receiving detector array is an array consisting of a plurality of discrete detector chips or an array consisting of a single detector chip with a plurality of detector units, wherein, working wavelengths of the channels of the detector chip array and of the laser chip array are corresponding to each other.

Preferably in the embodiment, the first fast axis collimating lens and the second fast axis collimating lens are cylindrical lenses whose directrix planes of cylindrical planes are perpendicular to slow axis planes of the light-emitting units of the laser chip array, the first slow axis collimating lens, the slow axis focusing lens and the second slow axis collimating lens are cylindrical lens whose directrix planes of cylindrical planes are parallel to slow axis planes of the light-emitting units of the laser chip array, and the first fast axis collimating lens and the second fast axis collimating lens are an integral fast axis collimating lens shared by the chip arrays, or an array consisting of a plurality of discrete fast axis collimation micro-lenses.

Preferably in the embodiment, the slow axis focusing lens and the second slow axis collimating lens constitute a light beam expanding/shrinking system in the slow axis planes of the light-emitting units of the laser chip array, and according to the direction of the received light, it is set that a back focus of the second slow axis collimating lens is a front focus of the slow axis focusing lens.

Preferably in the embodiment, the front focus of the first fast axis collimating lens and the front focus of the first slow axis collimating lens are arranged so that the orientations of light emission coincide, and the light-emitting units of the laser chip array are subsequently arranged on a common front focal plane of the first slow axis collimating lens and the first fast axis collimating lens; the back focus of the first slow axis collimating lens and the back focus of the second fast axis collimating lens are arranged so that the orientations of light receiving coincide, and the detector units of the light receiving detector array are subsequently arranged on common back focal plane of the first slow axis collimating lens and the second fast axis collimating lens.

Preferably in the embodiment, the coupling output lens and the coupling input lens are a spherical lens, an aspherical lens or a gradual index lens.

Advantageous Effects

Compared with the prior art, the present invention has the advantageous effects of better diffraction grating filtering property for the optical wavelength multiplexing/demultiplexing, smaller coupling loss and insertion loss correlative with wavelength, larger independent optical element sizes, and simpler assembly process, and is more suitable for manufacturing a multi-channel (four channels and more) optical wavelength division multiplexing/demultiplexing optical transceiving assembly. The assembly has both the emitting and receiving functions, can effectively reduce the use of the shell and the size of the module, is helpful for module integration and reduces the cost. The transmitting element and the receiving element share a filter optical element and most of the optical lens, so that the number of the small size independent components is obviously reduced in the case of multi-channel multiplexing/demultiplexing.

DETAILED DESCRIPTION OF THE PREFERRED EMBODIMENTS

Figure 1:
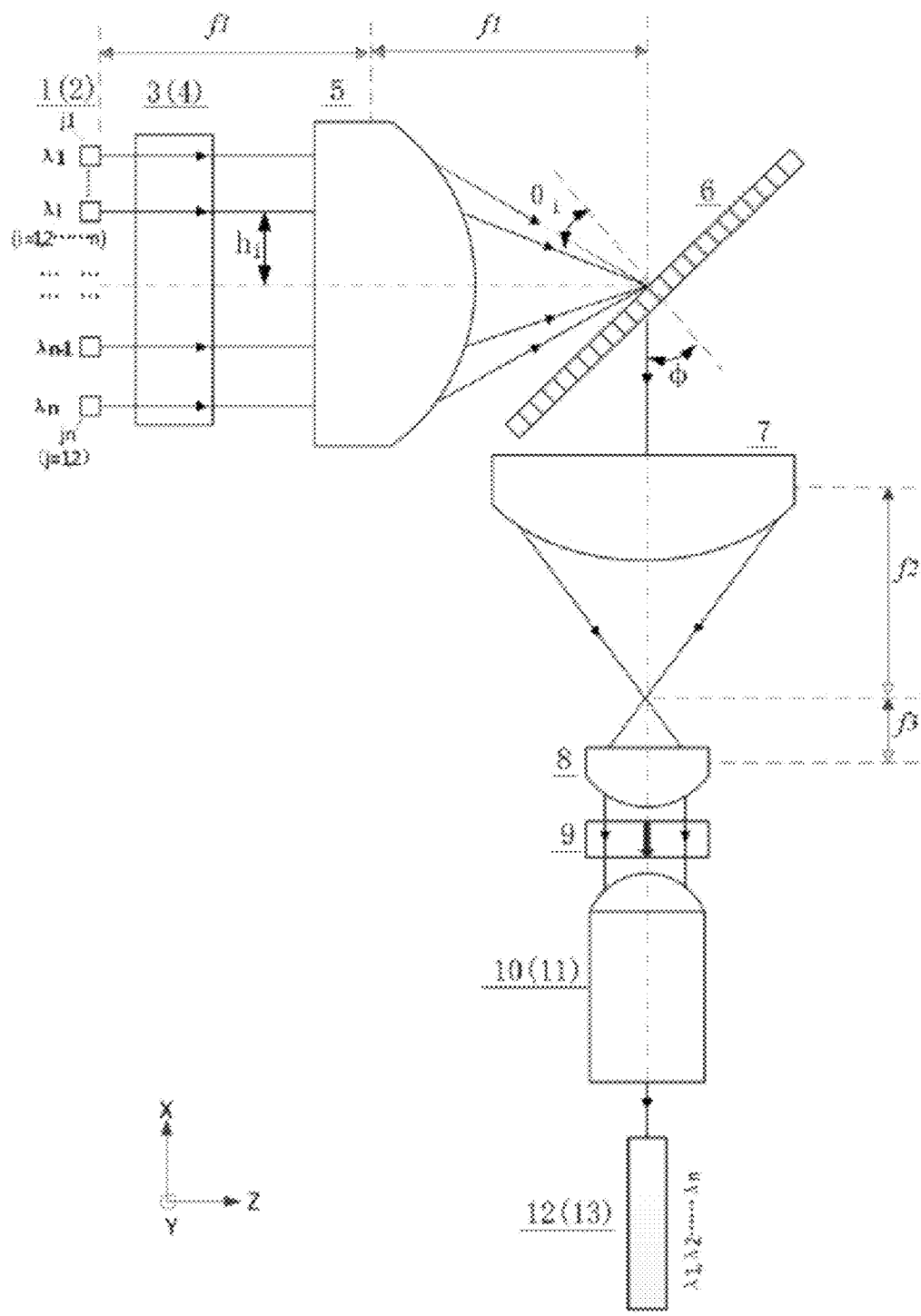
FIG. 1 is the planar structure schematic diagram according to the embodiment of the present invention.

In the following, the present invention will be described in further detail with reference to the drawings and the detailed embodiments. Examples of the embodiments are shown in the drawings, wherein the same or similar labels represent the same or similar elements or components having the same or similar functions from beginning to end. The following embodiments illustrated with reference to the drawings are exemplary, only used to explain the technical solutions of the present invention, and should not be understood as a limitation to the present invention.

In the description of the present invention, the orientation or position relations indicated by the terms "inside", "outside", "longitudinal", "lateral", "upper", "lower", "top" and "bottom" are the orientations or positions based on the drawings, are only used to facilitate the describing of the present invention, rather than requiring the present invention to be manufactured or operated in the specific orientations, and thus should not be understood as a limitation to the present invention.

The present invention provides a wavelength division multiplexing/demultiplexing optical transceiving assembly based on a diffraction grating, wherein an uplink optical emitting unit and a downlink optical receiving unit share a common wavelength division multiplexing/demultiplexing light path structure. The multiple light beams from light-emitting units with different wavelengths are collimated by the fast and slow axes, light beam combined by the diffraction grating, and converged to a same light outputting port by the collimated light beam compression unit successively. The light beams with different wavelengths received by an inputting port are collimated and light beam expanded, and splitted into a plurality of parallel light beams with different emitting angles in space by the diffraction grating light beam splitter unit, and each of the parallel light beams is focused on each detector unit of the light receiving detector array by the slow and fast axis focusing lenses.

In the embodiment of the present invention, the wavelength division multiplexing/demultiplexing optical transceiving assembly based on a diffraction grating can be applied to the case that multi-channels of wavelengths of CWDM or LAN-WDM work simultaneously, and the number of the commonly used channels is 4, 8, 16 or any other number. The structures of the wavelength division multiplexing/demultiplexing optical transceiving assemblies with different numbers of channels are basically the same, and the difference between them is that as the number of the optical channels changes, the number of the light-emitting units of the corresponding laser chip array and the number of the detector units of the light receiving detector array will increase, and the figure size of the first fast axis collimating lens along the arranging direction of the laser chip array and the figure size of the second fast axis collimating lens along the arranging direction of the light receiving detector array will increase, or the number of the micro-lens units of the first micro-lens array and the second micro-lens array of the laser will changes accordingly.

Figure 2:
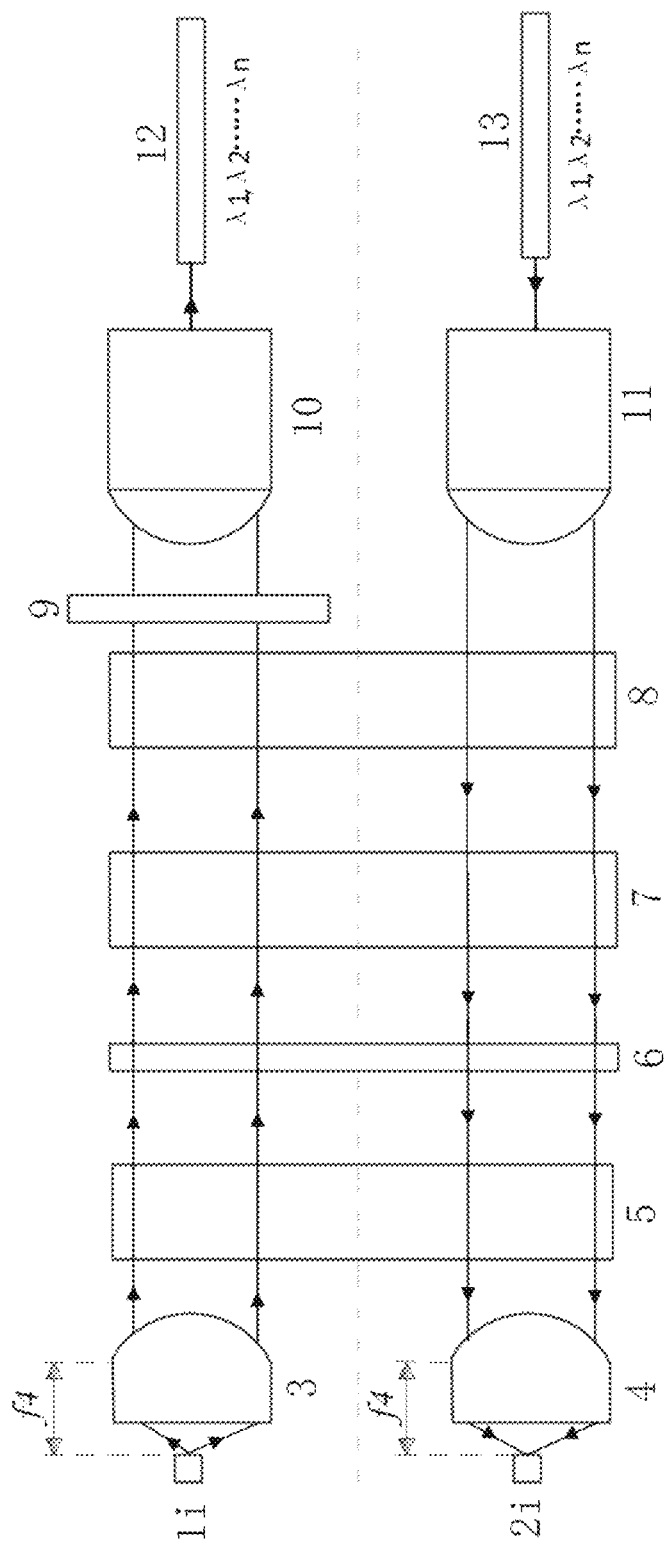
FIG. 2 is the planar structure schematic diagram in another view according to the embodiment of the present invention.

Referring to FIG. 1, FIG. 1 is a planar structure schematic diagram of the embodiment of the wavelength division multiplexing/demultiplexing optical transceiving assembly based on a diffraction grating that is provided by the present invention. FIG. 2 is a structural schematic diagram of the equivalent spreading light path from the diffraction grating. In the figure, the optical transceiving assembly comprises a laser chip array 1, a light receiving detector array 2, a first fast axis collimating lens 3, a second fast axis collimating lens 4, a first slow axis collimating lens 5, a diffraction grating 6, a slow axis focusing lens 7, a second slow axis collimating lens 8, an optical isolator 9, a coupling output lens 10, a coupling input lens 11, a coupling outputting optical fiber 12 and a coupling inputting optical fiber 13.

The optical emitting unit according to the light path setting comprises the laser chip array 1, the first fast axis collimating lens 3, the first slow axis collimating lens 5, the diffraction grating 6, the slow axis focusing lens 7, the second slow axis collimating lens 8, the optical isolator 9, the coupling output lens 10 and the coupling outputting optical fiber 12.

The optical receiving unit according to the light path setting comprises the coupling inputting optical fiber 13, the coupling input lens 11, the second slow axis collimating lens 8, the slow axis focusing lens 7, the diffraction grating 6, the first slow axis collimating lens 5, the second fast axis collimating lens 4 and the light receiving detector array 2.

The laser chip array 1, the first fast axis collimating lens 3, the optical isolator 9, the coupling output lens 10, and the coupling outputting optical fiber 12 are in the same plane I. The light receiving detector array 2, the second fast axis collimating lens 4, the coupling input lens 11 and the coupling inputting optical fiber 13 are in the same plane II. The plane I and the plane II locate on the two sides of the central plane of the system light path, and are parallel to each other (parallel to the XOZ plane in FIG. 1). The reticle direction of the diffraction grating 6 is perpendicular to the plane I and the plane II. The first fast axis collimating lens 3 and the second fast axis collimating lens 4 are cylindrical mirrors whose directrix planes of the cylindrical planes are perpendicular to the plane I and the plane II (parallel to the YOZ plane in FIG. 2). The first slow axis collimating lens 5, the slow axis focusing lens 7 and the second slow axis collimating lens 8 are cylindrical mirrors whose directrix planes of the cylindrical planes are parallel to the plane I and the plane II (parallel to the XOZ plane in FIG. 1).

The laser chip array and the light receiving detector array are perpendicularly arranged about the central plane of the light path.

The laser chip array 1 has a light-emitting unit, wherein the laser chip array is an array consisting of a plurality of discrete laser chips with different wavelengths or an array consisting of a single laser chip having a plurality of light-emitting units with different wavelengths. The wavelengths of the channels may be different CWDM or LWDM wavelengths meeting the IEEE specification, and may also be any other wavelengths.

The light receiving detector array 2 is an array consisting of a plurality of discrete detector chips or an array consisting of a single detector chip with a plurality of detector units, wherein the working wavelengths of the channels of the detector chip array and the laser chip array 1 are corresponding to each other.

The slow axis focusing lens 7 and the second slow axis collimating lens 8 constitute a light beam expanding/shrinking system in the slow axis direction (in the sagittal plane). According to the direction of the received light, the back focus of the second slow axis collimating lens 8 is the front focus of the slow axis focusing lens 7.

The coupling output lens 10 and the coupling input lens 11 may be a C-Lens (spherical lens) or a G-Lens (gradual index lens), and may also be other spherical and aspherical lenses.

According to the direction of the emitted light, the front focus of the first fast axis collimating lens 3 and the front focus of the first slow axis collimating lens 5 coincide. The light-emitting units of the laser chip array 1 are subsequently arranged in the common front focal plane of the first slow axis collimating lens 5 and the first fast axis collimating lens 3, according to the amplitudes of wavelengths.

According to the direction of the light receiving, the back focus of the first slow axis collimating lens 5 and the back focus of the second fast axis collimating lens 4 coincide. The detector units of the light receiving detector array 2 are subsequently arranged in the common back focal plane of the first slow axis collimating lens 5 and the second fast axis collimating lens 4, according to the amplitudes of wavelengths.

In FIG. 1 and FIG. 2, it is assumed that the diffraction grating is a transmission grating, and the central axes of the optical systems in front and back of the grating are perpendicular to each other, the spacing hi between the waveguide center of the i light-emitting unit of the laser chip array 1, the central location of the i detector unit of the light receiving detector array 2 and the central axis of the optical system is:

$$h_i = f_1 * \tan\left(90° - \phi - \arcsin\left(\frac{\lambda_1}{d} - \sin(\phi)\right)\right)$$

wherein $\lambda_i$ is the central wavelength of the i light-emitting unit (i=1, 2 . . . n−1, n, wherein n is the number of the light channels), d is the grating constant of the diffraction grating 6, $\phi$ is the angle between the incident parallel light beam and the grating normal according to the direction of the received light, and $f_1$ is the effective focal length of the first slow axis collimating lens 5.

It should be noted that the description about the locations of the i light-emitting unit of the laser chip array 1 and the i detector unit of the light receiving detector array 2 is illustrative, and is an application example in the embodiments, and the present invention is not limited thereto.

The specific process of the wavelength division multiplexing of the optical emitting unit is described as that: n light beams with different wavelengths emitted from the laser chip array 1 subsequently pass through the first fast axis collimating lens 3 and the first slow axis collimating lens 5 to be collimated in meridian plane (fast axis) and the sagittal plane (slow axis), and then are projected to the diffraction grating 6. The collimated light beams with different wavelengths are diffracted by the diffraction grating to conduct light beam combining, then pass through the slow axis focusing lens 7 and the second slow axis collimating lens 8 to realize the light beam shrinkage in the slow axis direction (in the sagittal plane), enter the optical isolator 9, and finally are coupled into the coupling outputting optical fiber 12 through the coupling output lens 10.

The specific process of the demultiplexing of the optical receiving unit is described as that: the inputted light signals containing various signal lights with different wavelengths firstly pass through the collimator consisting of the coupling inputting optical fiber 13 and the coupling input lens 11 to be collimated to parallel light beam, and the parallel light beam then passes through the second slow axis collimating lens 8 and the slow axis focusing lens 7 to realize the light beam expansion in the slow axis direction (in the sagittal plane). The expanded parallel light beam passes through the diffraction grating 6 to be splitted into single-channel light signals in sequence with different grating angles $\theta_i$. The single-channel light signals with different wavelengths that passed the diffraction grating 6 pass through subsequently the first slow axis collimating lens 5 and the second fast axis collimating lens 4, so that the lights with different wavelengths are respectively focused in the sagittal plane (slow axis) and the meridian plane (fast axis) along the reticle direction of the grating on the common back focal plane of the first slow axis collimating lens 5 and the second fast axis collimating lens 4, and are arranged in different positions, that is, focused on different detector units of the light receiving detector array 2.

What is claimed is:

1. A wavelength division multiplexing/demultiplexing optical transceiving assembly based on a diffraction grating, which is an uplink optical emitting unit and a downlink optical receiving unit that comprise a laser chip array, a light receiving detector array, a first fast axis collimating lens, a second fast axis collimating lens, a first slow axis collimating lens, a diffraction grating, a slow axis focusing lens, a second slow axis collimating lens, an optical isolator, a coupling output lens, a coupling input lens, a coupling outputting optical fiber and a coupling inputting optical fiber, wherein: the first fast axis collimating lens and the laser chip array are arranged correspondingly to each other, the second fast axis collimating lens and the light receiving detector array are arranged correspondingly to each other, the laser chip array and the light receiving detector array are arranged perpendicularly and staggered vertically, the coupling output lens and the coupling outputting optical fiber constitute an outgoing optical fiber collimator and the coupling input lens and the coupling inputting optical fiber constitute an incoming optical fiber collimator, which respectively output an emitted light signal and receive an incident light signal, and the emitted light and the incident light are distributed in the up and down direction to pass through the first slow axis collimating lens, the diffraction grating, the slow axis focusing lens and the second slow axis collimating lens.

2. The optical transceiving assembly as claimed in claim 1, wherein: the optical emitting unit and the receiving unit share the first slow axis collimating lens, the diffraction grating, the slow axis focusing lens and the second slow axis collimating lens, the first fast axis collimating lens and the second fast axis collimating lens are used for light beam collimation in the meridian plane, the first slow axis collimating lens is used for light beam collimation in the sagittal plane, the diffraction grating light path is used for wavelength division multiplexing/demultiplexing, the slow axis focusing lens and the second slow axis collimating lens constitute a light beam expanding/shrinking system to realize light beam transformation, and the optical isolator is used to realize reverse isolation of the outputted light.

3. The optical transceiving assembly as claimed in claim 2, wherein: the optical emitting unit according to the light path setting comprises the laser chip array, the first fast axis collimating lens, the first slow axis collimating lens, the diffraction grating, the slow axis focusing lens, the second slow axis collimating lens, the optical isolator, the coupling output lens and the coupling outputting optical fiber.

4. The optical transceiving assembly as claimed in claim 3, wherein: the optical receiving unit according to the light path setting comprises the coupling inputting optical fiber, the coupling input lens, the second slow axis collimating lens, the slow axis focusing lens, the diffraction grating, the first slow axis collimating lens, the second fast axis collimating lens, and the light receiving detector array.

5. The optical transceiving assembly as claimed in claim 4, wherein: the laser chip array has a light-emitting unit, wherein, the laser chip array is an array consisting of a plurality of discrete laser chips with different wavelengths, or an array consisting of a single laser chip having a plurality of light-emitting units with different wavelengths.

6. The optical transceiving assembly as claimed in claim 5, wherein: the light receiving detector array is an array consisting of a plurality of discrete detector chips or an array consisting of a single detector chip with a plurality of detector units, wherein, working wavelengths of the channels of the detector chip array and of the laser chip array are corresponding to each other.

7. The optical transceiving assembly as claimed in claim 6, wherein: the first fast axis collimating lens and the second fast axis collimating lens are cylindrical lenses whose directrix planes of cylindrical planes are perpendicular to slow axis planes of the light-emitting units of the laser chip array, the first slow axis collimating lens, the slow axis focusing lens and the second slow axis collimating lens are cylindrical lens whose directrix planes of cylindrical planes are parallel to slow axis planes of the light-emitting units of the laser chip array, and the first fast axis collimating lens and the second fast axis collimating lens are an integral fast axis collimating lens shared by the chip arrays, or an array consisting of a plurality of discrete fast axis collimation micro-lenses.

8. The optical transceiving assembly as claimed in claim 7, wherein: the slow axis focusing lens and the second slow axis collimating lens constitute a light beam expanding/shrinking system in the slow axis planes of the light-emitting units of the laser chip array, and according to the direction of the received light, it is set that a back focus of the second slow axis collimating lens is a front focus of the slow axis focusing lens.

9. The optical transceiving assembly as claimed in claim 8, wherein: the front focus of the first fast axis collimating lens and the front focus of the first slow axis collimating lens are arranged so that the orientations of light emission coincide, and the light-emitting units of the laser chip array are subsequently arranged on a common front focal plane of the first slow axis collimating lens and the first fast axis collimating lens; the back focus of the first slow axis collimating lens and the back focus of the second fast axis collimating lens are arranged so that the orientations of light receiving coincide, and the detector units of the light receiving detector array are subsequently arranged on common back focal plane of the first slow axis collimating lens and the second fast axis collimating lens.

10. The optical transceiving assembly as claimed in claim 9, wherein: the coupling output lens and the coupling input lens are a spherical lens, an aspherical lens or a gradual index lens.

\* \* \* \* \*